US006441360B1

(12) United States Patent
Bishop et al.

(10) Patent No.: US 6,441,360 B1
(45) Date of Patent: Aug. 27, 2002

(54) MEMS OPTICAL ISOLATORS

(75) Inventors: David John Bishop, Summit; Randy Clinton Giles, Whippany, both of NJ (US)

(73) Assignees: Lucent Technologies, Inc., Murray Hill, NJ (US); Agere Systems Guardian Corp., Miami Lakes, FL (US)

(*) Notice: Subject to any disclaimer, the term of this patent is extended or adjusted under 35 U.S.C. 154(b) by 0 days.

(21) Appl. No.: 09/515,412

(22) Filed: Feb. 29, 2000

Related U.S. Application Data

(60) Provisional application No. 60/164,457, filed on Nov. 10, 1999.

(51) Int. Cl.[7] .............................. H01J 3/14; H01J 5/16; H01J 40/14
(52) U.S. Cl. ..................... 250/216; 250/234; 250/237 R
(58) Field of Search ................................. 250/216, 226, 250/234, 236, 237 R

(56) References Cited

U.S. PATENT DOCUMENTS 6,137,105 A * 10/2000 Drobot et al. .............. 250/234
6,201,629 B1 * 3/2001 McClelland et al. ........ 359/223

* cited by examiner

Primary Examiner—Robert H. Kim
Assistant Examiner—Courtney Thomas
(74) Attorney, Agent, or Firm—Cohen, Pontani Lieberman & Pavane

(57) ABSTRACT

An opto-isolator incorporating a MEMS device includes an optical signal source and an optical signal detector defining therebeween an optical path for communication of optical signals. A MEMS device having an actuator for controlling a moveable element is disposed between the source and detector for manipulating the optical signals. In one embodiment, the moveable element is a shutter which is operable to selectively allow optical signals to be received by the detector and prevent signals from being detected. In another embodiment, the moveable member is a MEMS tilt mirror for selectively directing optical signals to the detector.

7 Claims, 2 Drawing Sheets

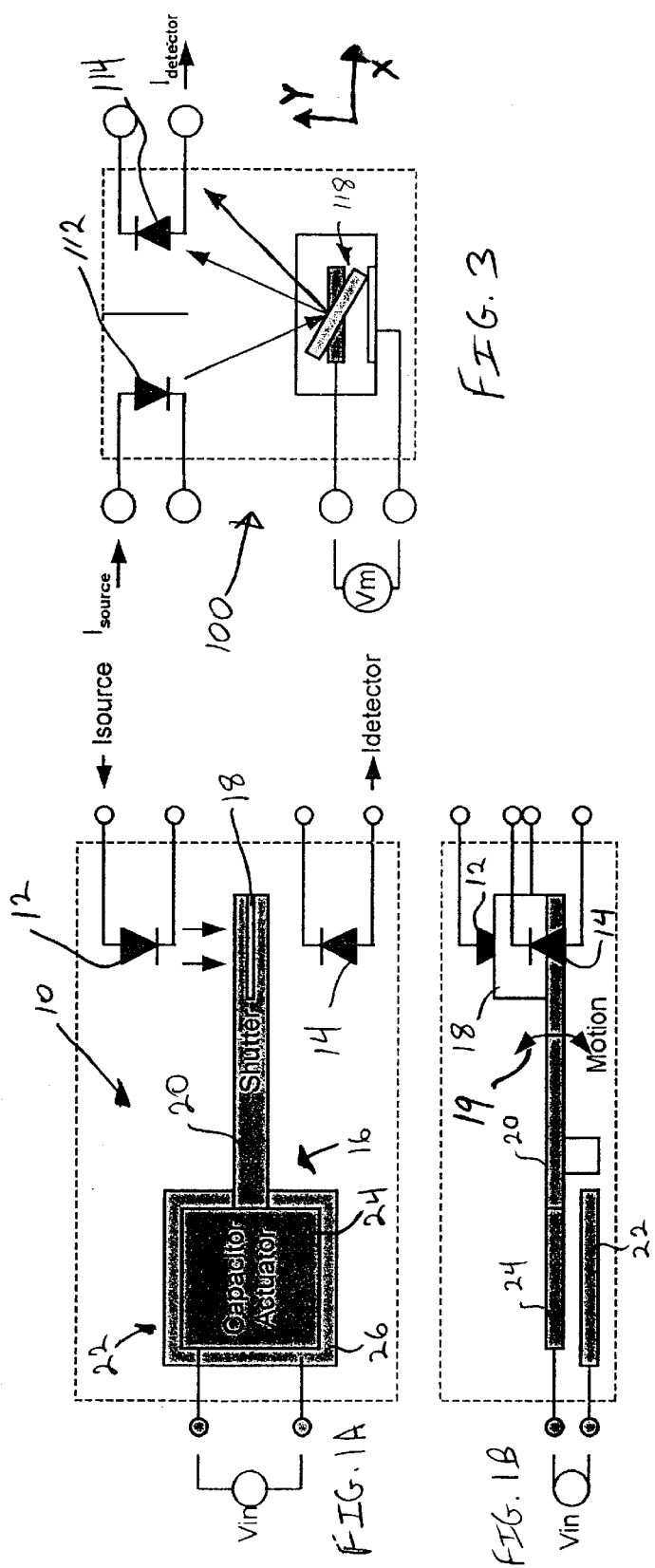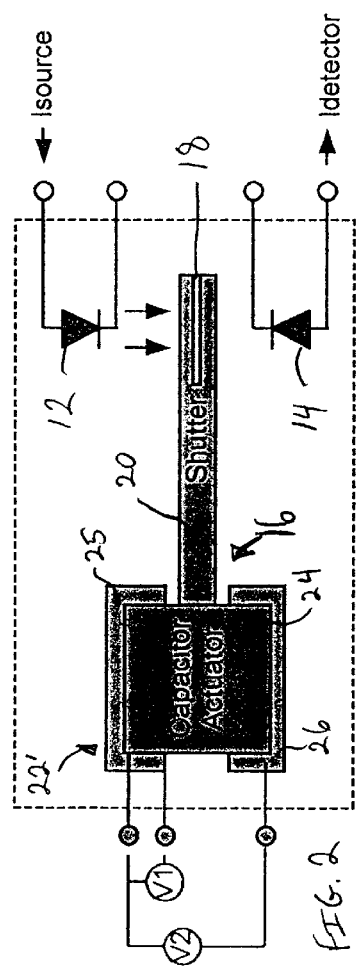

MEMS OPTICAL ISOLATORS

RELATED APPLICATIONS

This application claims priority from provisional application Serial No. 60/164,457, filed Nov. 10, 1999.

BACKGROUND OF THE INVENTION

1. Field of the Invention

This invention is related to optical isolators utilizing micro-electromechanical systems (MEMS).

2. Description of the Related Art

Electromechanical devices combine electrical and mechanical attributes as in motors and magnetic relays. There are also opto-electronic devices which combine light generation and/or light detection with electronics, such as in optical transmitters and receivers. Optical isolators ("opto-isolators") are typically used in applications where a non-electrical connection in an electrical system is needed, such as to provide electrical isolation between components of a system. Such uses are widespread in biology, chemistry, physics, medicine and engineering. In medicine, for example, medical equipment may be interfaced with a patient through sensors or probes that are further connected to monitoring apparatus. For safety, the sensors/probes must be electrically isolated from the monitoring apparatus to protect against voltage surges and spikes that could injure or harm a patient. This isolation is accomplished by utilizing opto-isolators that convert an electrical signal to an optical signal for receipt by an optical detector. After receipt, the optical signal is typically re-converted to an electrical signal (i.e. a photo-current is generated) for analysis or processing.

MEMS is a technology that exploits lithographic mass fabrication techniques of the kind that are used by the semiconductor industry in the manufacture of silicon integrated circuits. Generally, the technology involves preparing a multilayer structure by sequentially depositing and shaping layers of a multilayer wafer that typically includes a plurality of polysilicon layers that are separated by layers of silicon oxide and silico nitride. The shaping of individual layers is commonly performed by etching, which is itself generally controlled by masks that are patterned by photo-lithographic techniques. The technology may also involve the etching of intermediate sacrificial layers of the wafer to release overlying layers for use as thin elements that can be easily-deformed or moved.

MEMS technology has proven highly versatile and has been used to form a wide variety of miniature devices varying in size from millimeters to microns. MEMS technology is discussed, for example, in a paper entitled "MEMS the Word for Optical Beam Manipulation", published in *Circuits and Devices*, Jul. 1997, pp. 11–18.

MEMS technology allows for the production of opto-isolators which are smaller and operate with lower power consumption than pre-existing designs.

SUMMARY OF THE INVENTION

The present invention is directed to an optical isolator for selectively conveying an optical signal along an optical path from a signal source to a detector spaced from the source. This functionality is accomplished by generating an optical signal from the signal source and directing it to a MEMS device positioned in the optical path between the source and detector. The MEMS device includes a moveable element which, when activated, will selectively direct the optical signal between the source and detector.

In one embodiment, the moveable element is a shutter which can be moved to a position directly in the optical path for preventing or limiting the detection of the optical signal by the detector, and out of the optical path for allowing detection of the optical signal.

In another embodiment, the moveable element is a MEMS tilt mirror operable for providing a variable optical signal attenuator. By selectively controlling an amount of tilt applied to the tilt mirror, the amount of light directed to the detector can be varied.

In yet another embodiment, aperture elements are used to configure the shape of the optical signal. A source aperture is disposed between a moveable MEMS element and an optical source for shaping the optical signal prior to receipt by the MEMS element. A detector aperture may also be included between the moveable MEMS element and the optical detector.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 1A is a top-plan schematic view of an opto-isolator in accordance with one embodiment of the present invention;

FIG. 1B is a side view of the opto-isolator of FIG. 1A;

FIG. 2 is a top-plan schematic view of a modified form of the device of FIGS. 1A and 1B;

FIG. 3 is a schematic representation of still another embodiment of the present invention.

DETAILED DESCRIPTION OF THE PREFERRED EMBODIMENTS

Figure 4:
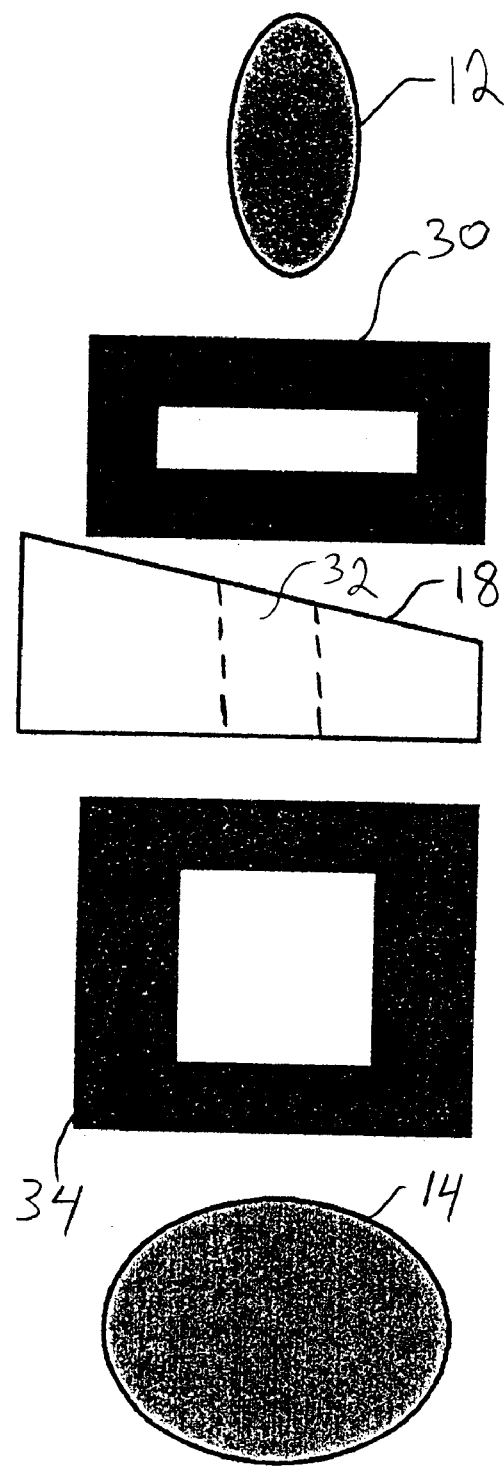
FIG. 4 is a diagrammatic illustration of the use of aperture elements in accordance with the present invention.

FIG. 1A depicts a MEMS opto-isolator 10 in accordance with a currently preferred embodiment of the invention. Isolator 10 includes an optical source 12 such as an LED or other optical signal generator for generating an optical signal, as is known in the art. An optical detector 14 is spaced at a distance from the source 12 and within the optical path of the generated optical signal for receiving or detecting the generated optical signal in accordance with the invention. The function and operation of detector 14 is well-known to those having ordinary skill in the art, and further description thereof is not deemed necessary.

A MEMS device 16 is included in isolator 10 for providing selective communication of the optical signal to detector 14. Specifically, MEMS device 16 includes a moveable element 18 connected to and controlled by a moveable member such as an arm or beam 20 which, in turn, is controlled by an actuator 22 having control electrodes 24 and 26. Moveable element 18 is a shutter-type blocking or masking element that is moveable between a first position and a second position along a path or direction shown by arrows 19 in FIG. 1B. When in a first position, shutter 18 is disposed in the optical path to act upon the optical signal as it travels along the optical path. For example, and in accordance with one embodiment of the present invention in which shutter 18 is a blocking element, when shutter 18 is disposed in the first position light will be absorbed by the shutter and thereby be prevented from reaching detector 14. In another embodiment, shutter 18 may be coated with a reflective material, such as aluminum, for reflecting the optical signal back toward or in the general direction of optical source 12 for receipt, for example, by a detector positioned in substantial alignment with the reflected optical signal. Shutter 18 may also be a masking element, as explained more fully below, wherein an aperture is formed therein for shaping the optical signal prior to receipt by the detector 14 when the shutter is in the first position.

When the MEMS device 16 is activated, shutter 18 is moved to its second position outside of the optical path to thus allow the optical signal to be conveyed uninhibited to the detector 14 for generating a photocurrent, as is known in the art. Alternatively, the shutter can be positioned outside of the optical path and moved into the optical path upon application of a voltage. When the shutter is outside of the optical path, the device may be a conventional optoisolator. The operation of MEMS shutter device 16 is more fully disclosed in commonly-owned and copending U.S. patent application Ser. No. 09/197,317, filed Nov. 20, 1998, the entire content of which is incorporated herein by reference.

The three components, i.e. MEMS device 16, optical source 12 and optical detector 14, can be assembled in a single package (as suggested the dashed line in FIG. 1A), to create a 6-terminal MEMS opto-isolator. This packaging can be implemented, by way of example, in a standard miniDip carrier or a small outline (SOT) style package. The main electrical attribute of the MEMS opto-isolator is that there are now three pairs of electrically isolated terminals: those for the MEMS shutter, the light source, and the detector. The elements forming the device 10 can be readily expanded to include a number of MEMS shutters, sources and detectors, as a general matter of design choice, to produce MEMS opto-isolators of arbitrary complexity.

A significant property of the MEMS opto-isolator is the very high impedance and low capacitance of the MEMS shutter terminals. Typically, the dc resistance is in the hundred giga-ohms range and the capacitance is less than a picofarad. In contrast, the LED terminals of a conventional opto-isolator operate at milliamps current levels.

With the inventive MEMS opto-isolator, new approaches to circuit design, as for example ultra-low power electronics on the MEMS terminals, are now feasible. The MEMS shutter can be operated in a saturated mode with the shutter voltage being either zero or $V_{max}$, and the opto-isolator can be then used as a simple digital switch. The shutter may also be operated in an analog mode with input and output signals being continuous functions. When such continuous function input-outputs are used, a linear transfer function between the input applied voltage and the output signal can be realized; this will allow many board-level applications, as well as uses as a high-impedance electrostatic probe for test instrumentation.

More complex analog functions are also within the intended scope and contemplation of the invention, utilizing properties of the MEMS shutter voltage response, the source intensity distribution, the shutter shape, source and detector aperturing, and the detector shape. A non-linear voltage response of the MEMS shutter motion may be used in special function blocks, such for example as logarithmic-amplifiers and square-root generators.

With reference now to FIG. 4, various geometries for the source detector 14 and optical source 12 can be selectively employed to predeterminately adjust or manipulate the shape of the optical signal in the MEMS opto-isolator transfer function. For example, a source aperture element 30 can be included between the optical source 12 and the shutter element 18 to manipulate the shape of the optical signal prior to receipt by the shutter 18. In addition, or instead, a detector aperture element 34 may be included between the shutter element 18 and detector 14 for further or similar shaping of the optical signal. Also, and as explained above, the shutter element 18 can itself include or be formed with a selected sized aperture 32 for providing further optical signal manipulation.

Multi-mode or single-mode optical elements, such as optical waveguides or optical fibers, may be used to tailor the light transmission properties or spatially separate the source, detector or both from the main MEMS opto-isolator package. The MEMS opto-isolator can also function as a signal rectifier since the shutter displacement depends upon the magnitude of the voltage applied thereto and not the polarity.

A modification of the oscillator 10 of FIGS. 1A and 1B is shown in FIG. 2. In the FIG. 2 embodiment, actuator 22 is replaced with actuator 22' which has three separate actuator electrodes 24, 25 and 26 that can accommodate two separate voltage sources (V1 and V2). Voltage V1 is shown applied between actuation electrodes 24 and 25, and voltage V2 between electrodes 24 and 26. The use of actuator 22' allows for shutter placement versatility in that the shutter placement is dictated by the difference in the potential applied between the actuation electrodes. By employing multiple actuation electrodes in this manner, a range of voltages can be applied to the actuator 22' for selectively yielding a variety of predetermined shutter positions.

Turning now to FIG. 3, a further modification of the oscillator 10 is shown as oscillator 100 wherein the MEMS shutter element 18 is replaced by a MEMS tilt mirror 118 positioned in the optical path between the optical source 112 and optical detector 114. The operation and construction of tilt mirror 118 is described in commonly-owned and copending U.S. patent application Ser. No. 09/415,178, filed Oct. 8, 1999, the entire content of which is incorporated by reference herein. As explained in the aforementioned patent application, tilt mirror 118 is variably tiltable about one or more axes based on a level of voltage applied to the actuating electrodes. By utilizing tilt mirror 118 in the inventive opto-isolator 100, an optical signal can be received and selectively reflected by the mirror 118 in various directions, and to varying degrees, based on the voltage level applied to the electrodes. Thus, the optical signal can be reflected back to the optical source or reflected entirely to the optical detector, or a desired portion of the optical signal can be reflected to the optical detector. Moreover, when the tilt mirror 118 is used in conjunction with a shutter aperture element 32 and/or a detector aperture element 34, optical signal shaping and thereby still further control of the signal passed to the detector can be realized.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An opto-oscillor operable selectively controlling the transfer of an optical signal, comprising:

an optical signal source for producing the optical signal;

an optical signal detector for selectively receiving the optical signal from the source, said detector being spaced apart from and in selective optical communication with said optical source for defining an optical path between said source and said detector; and a MEMS device for selectively controlling optical communication of the optical signal between said signal source and said detector, said MEMS device comprising an actuator and a moveable shutter element having an aperture formed therein and positionable in said optical path and selectively movable by said actuator for adjusting the position of the moveable shutter element relative to the optical path when a voltage is applied to said actuator to thereby selectively control transfer of the produced optical signal from said source to said detector along the optical path as a function of the position of the movable shutter element relative to the optical path.

2. The oscillator of claim 1, wherein said shutter is selectively moveable between a first position within said optical path and a second position outside of said optical path by selective application of a voltage to said actuator.

3. The oscillator of claim 1, wherein said actuator is operable for moving said shutter to a multiplicity of predetermined positions relative to said optical path as a function of a voltage level applied to said actuator so as to enable selective control of the receipt of the produced optical signal by said detector.

4. The oscillator of claim 1, wherein said shutter is coated with a reflective material.

5. The oscillator of claim 1, further comprising a source aperture element disposed in the optical path between said optical source and said moveable shutter element for shaping the produced optical signal travelling along the optical path.

6. The oscillator of claim 1, further comprising a detector aperture element disposed between said moveable shutter element and said detector for shaping the produced optical signal travelling along the optical path.

7. The oscillator of claim 5, further comprising a detector aperture element disposed between said moveable shutter element and said detector for shaping the produced optical signal travelling along the optical path.

* * * * *

UNITED STATES PATENT AND TRADEMARK OFFICE
CERTIFICATE OF CORRECTION

PATENT NO. : 6,441,360 B1
DATED : August 27, 2002
INVENTOR(S) : David John Bishop et al.

It is certified that error appears in the above-identified patent and that said Letters Patent is hereby corrected as shown below:

Column 5,
Line 1, change "oscillator" to -- isolator --.

Column 6,
Lines 5, 9, 15, 17, 22 and 26, change "oscillator" to -- isolator --.

Signed and Sealed this

Eleventh Day of March, 2003

JAMES E. ROGAN
*Director of the United States Patent and Trademark Office*